United States Patent [19]
Naftaly et al.

[11] Patent Number: 6,164,246
[45] Date of Patent: Dec. 26, 2000

[54] REMOTE RELEASE MUZZLE

[76] Inventors: David Naftaly; Josef Dvir, both of 63-36 98th Pl., Rego Park, N.Y. 11374

[21] Appl. No.: 09/307,353

[22] Filed: May 6, 1999

[51] Int. Cl.$^7$ ...................................................... A01K 29/00
[52] U.S. Cl. ........................................... 119/720; 119/831
[58] Field of Search .................................... 119/720, 721, 119/821, 822, 831, 814

[56] References Cited

U.S. PATENT DOCUMENTS 2,658,478  11/1953  Jones .
2,940,425  6/1960  Dykens .
5,099,800  3/1992  Fitzpatrick et al. ..................... 119/719
5,588,398  12/1996  Allen, II et al. ......................... 119/822

*Primary Examiner*—Peter M. Poon
*Assistant Examiner*—Yvonne R. Abbott

[57] ABSTRACT

A remote release muzzle for facilitating the quick release of a muzzle from a remote location. The remote release muzzle includes a muzzle having a spring loaded latch including a release tang plate actuatable using either a button operatively coupled to the release tang plate or a remotely actuatable electromagnet operatively coupled to a signal receiver within the latch housing.

12 Claims, 2 Drawing Sheets

REMOTE RELEASE MUZZLE

BACKGROUND OF THE INVENTION

1. Field of the Invention

The present invention relates to muzzles and more particularly pertains to a new remote release muzzle for facilitating the quick release of a muzzle from a remote location.

2. Description of the Prior Art

The use of muzzles is known in the prior art. More specifically, muzzles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,588,398; 2,658,478; 4,160,428; 4,476,810; 2,940,425; U.S. Pat. No. Des. 242,727; and U.S. Pat. No. 5,099,800.

While these devices fulfill their respective, particular objectives and requirements, the aforementioned patents do not disclose a new remote release muzzle. The inventive device includes a muzzle having a spring loaded latch including a release tang plate actuatable using either a button operatively coupled to the release tang plate or a remotely actuatable electromagnet operatively coupled to a signal receiver within the latch housing.

In these respects, the remote release muzzle according to the present invention substantially departs from the conventional concepts and designs of the prior art, and in so doing provides an apparatus primarily developed for the purpose of facilitating the quick release of a muzzle from a remote location.

SUMMARY OF THE INVENTION

In view of the foregoing disadvantages inherent in the known types of muzzles now present in the prior art, the present invention provides a new remote release muzzle construction wherein the same can be utilized for facilitating the quick release of a muzzle from a remote location.

The general purpose of the present invention, which will be described subsequently in greater detail, is to provide a new remote release muzzle apparatus and method which has many of the advantages of the muzzles mentioned heretofore and many novel features that result in a new remote release muzzle which is not anticipated, rendered obvious, suggested, or even implied by any of the prior art muzzles, either alone or in any combination thereof.

To attain this, the present invention generally comprises a muzzle having a spring loaded latch including a release tang plate actuatable using either a button operatively coupled to the release tang plate or a remotely actuatable electromagnet operatively coupled to a signal receiver within the latch housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote release muzzle apparatus and method which has many of the advantages of the muzzles mentioned heretofore and many novel features that result in a new remote release muzzle which is not anticipated, rendered obvious, suggested, or even implied by any of the prior art muzzles, either alone or in any combination thereof.

It is another object of the present invention to provide a new remote release muzzle that may be easily and efficiently manufactured and marketed.

It is a further object of the present invention to provide a new remote release muzzle that is of a durable and reliable construction.

An even further object of the present invention is to provide a new remote release muzzle which is susceptible of a low cost of manufacture with regard to both materials and labor, and which accordingly is then susceptible of low prices of sale to the consuming public, thereby making such remote release muzzle economically available to the buying public.

Still yet another object of the present invention is to provide a new remote release muzzle which provides in the apparatuses and methods of the prior art some of the advantages thereof, while simultaneously overcoming some of the disadvantages normally associated therewith.

Still another object of the present invention is to provide a new remote release muzzle for facilitating the quick release of a muzzle from a remote location.

Yet another object of the present invention is to provide a new remote release muzzle which includes a muzzle having a spring loaded latch including a release tang plate actuatable using either a button operatively coupled to the release tang plate or a remotely actuatable electromagnet operatively coupled to a signal receiver within the latch housing.

Still yet another object of the present invention is to provide a new remote release muzzle that is releasable from an animal from a remote location such that the user can release the muzzle only after the animal is in close proximity to a potential attacker or intruder.

Even still another object of the present invention is to provide a new remote release muzzle that maximizes safety for the user while minimizing the opportunity for the user's animal to attack an innocent person by permitting release of the muzzle in close proximity to a target of the animal while the user remains positioned at a safe distance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
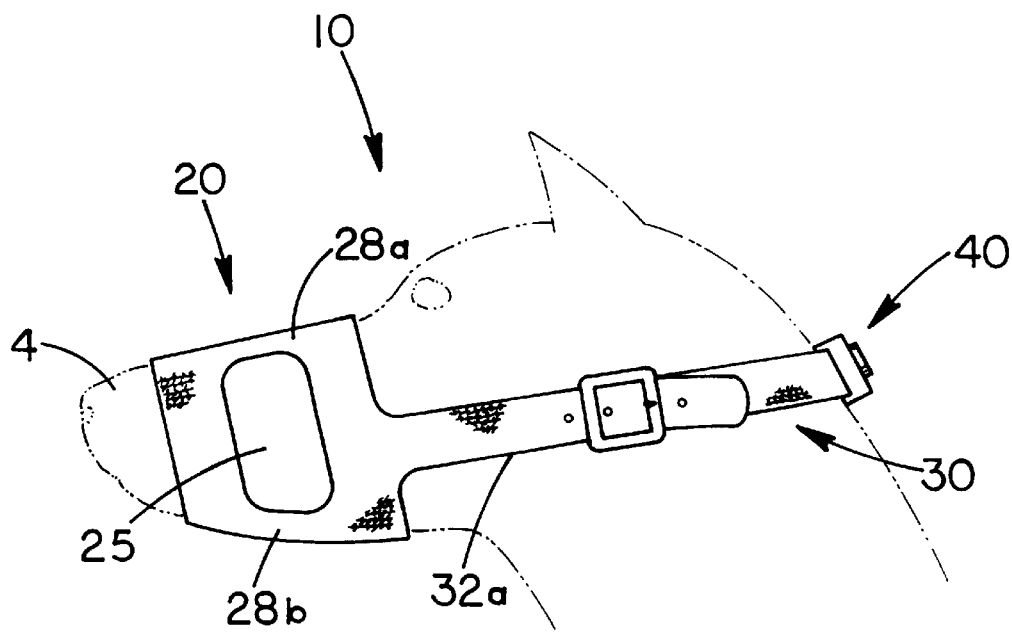
FIG. 1 is a side view of a new remote release muzzle according to the present invention.
Figure 2:
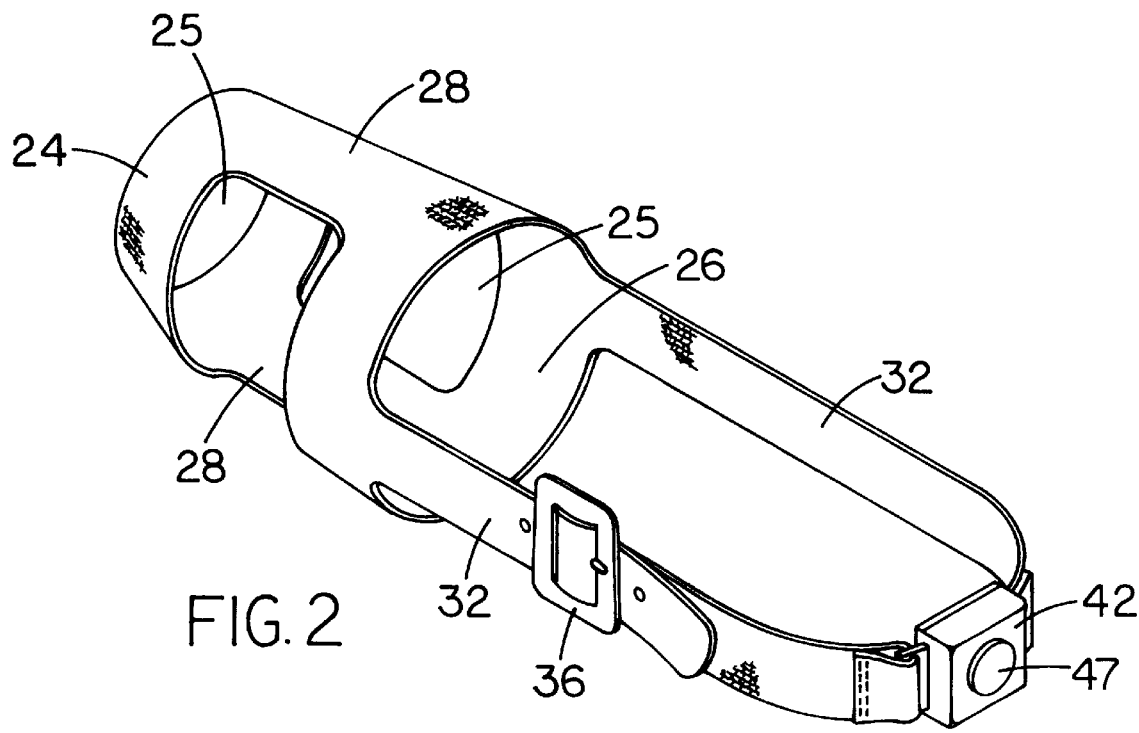
FIG. 2 is a perspective view of the present invention.
Figure 3:
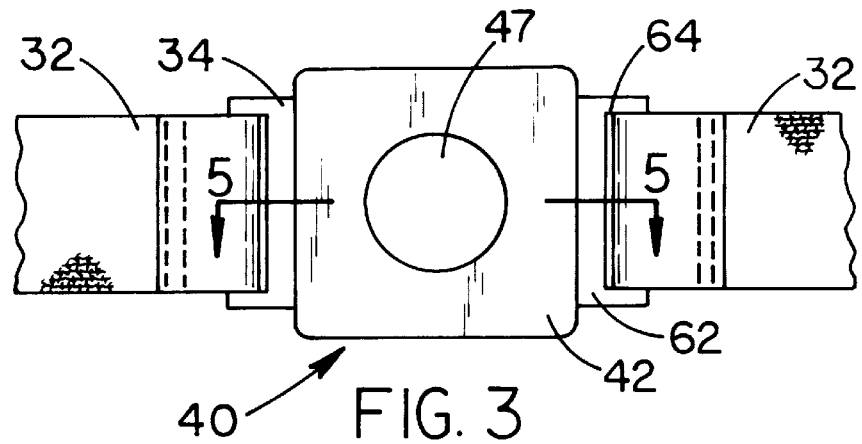
FIG. 3 is a top view of the release device of the present invention.
Figure 4:
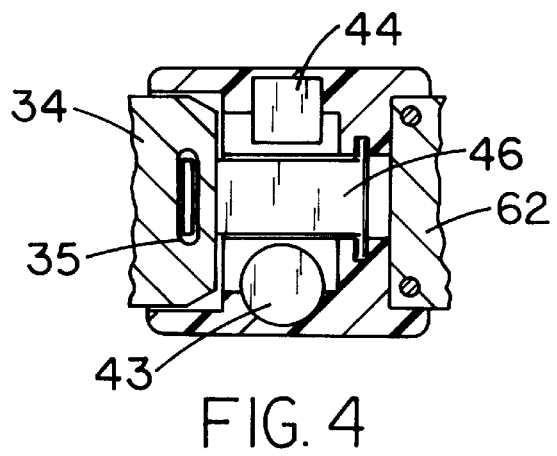
FIG. 4 is a cross-sectional view of the release device of the present invention taken along line 4—4 in FIG. 3.
Figure 5:
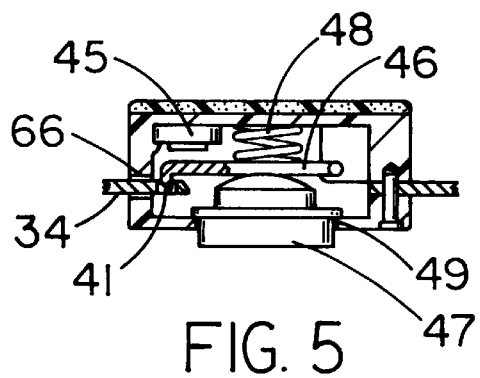
FIG. 5 is a cross-sectional view of the release device of the present invention taken along line 5—5 in FIG. 3.
Figure 6:
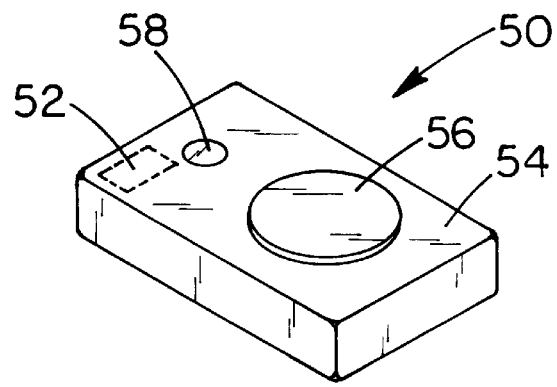
FIG. 6 is a perspective view of the transmitter assembly of the present invention.

With reference now to the drawings, and in particular to FIGS. 1 through 6 thereof, a new remote release muzzle embodying the principles and concepts of the present invention and generally designated by the reference numeral 10 will be described.

As best illustrated in FIGS. 1 through 6, the remote release muzzle 10 generally comprises a muzzle 20, an attachment strap assembly 30, and a release device 40. The muzzle 20 includes a snout surrounding portion 22 designed for positioning around the snout 4 of the animal. The attachment strap assembly 30 is designed for positioning around the head or neck of the animal such that the snout surrounding portion 22 is held around the snout 4 of the animal.

The attachment strap assembly 30 includes a pair of attachment straps 32 coupled to the release device 40.

The release device 40 is designed for disengaging from one of the attachment straps whereby the attachment strap assembly is disengaged from the animal. The release device includes a receiver 44 for receiving a release signal sent by a transmitter 52 from a remote location. The release device 40 further includes a housing 42, a release tang plate 46, a spring member 48, an electromagnet 45, a battery 43, and a manual release button 47.

The release tang plate is positioned within an interior of the housing. The release tang plate 46 includes a first end pivotally coupled to the housing 42 and a lip 41 positioned at a second end of the release tang plate 46. The lip 41 is designed for engaging a buckle 34 coupled to a first end of one of the attachment straps 32.

The spring member 48 is positioned within the housing 42 to abut a first face of the release tang plate 46 for biasing the release tang plate 46 into a locking position such that the lip 41 engages a locking slot 35 in the buckle 34 when the buckle 34 is inserted into the housing 42.

The electromagnet 45 is coupled to the housing 42 proximate the second end of the release tang plate 46. The electromagnet 45 is positioned to attract and engage the release tang plate 46 such that the spring member 48 is compressed by the release tang plate 46 when the electromagnet 45 is activated. Thus, when the electromagnet 45 is activated, the lip 41 is disengaged from the locking slot 35 of the buckle 34.

The electromagnet 45 is activated by the receiver 44 when the receiver 44 receives the release signal from the transmitter 52. The battery 43 is positioned in the housing 42 for providing power to the receiver 44 and the electromagnet 45.

The manual release button 47 extends through a hole 49 in the housing 42. The manual release button 47 abuts a second face of the release tang plate 46 such that depressing the button 47 pivots the release tang plate 46 and compresses the spring member 48 to release the lip 41 from the locking slot 35 in the buckle 34.

The attachment strap assembly 30 includes an adjustable sizing buckle 36 for adjusting the length of one of one of the attachment straps 32 such that the attachment strap assembly 30 is adjustable to snugly engage the animal for preventing accidental removal of the muzzle 20. A connecting plate 62 is fixedly coupled to and extends outwardly from the housing 42. The connecting plate 62 includes a slot 64 for receiving one of the attachment straps 32A to fixedly couple the strap 32A to the housing 42.

The housing 42 further includes a buckle receiving slot 66 positioned on an opposite side from the connecting plate 62. The buckle receiving slot 66 is designed for receiving the buckle 34 such that the lip 41 engages the slot 35 in the buckle 34 when the buckle 34 is inserted into the buckle receiving slot 66.

The transmitter assembly 50 includes a transmitter 52, a transmitter housing 54, a transmit button 56 for sending the release signal, and a signal light 58 for indicating that the release signal is being sent.

The muzzle 20 includes a distal loop 24, an interior loop 26 and a pair of connecting straps 28 extending between the distal loop 24 and the interior loop 26.

One of the connecting straps 28A is designed to extend along an upper surface of the snout 4 of the animal and the other connecting strap 28B is designed to extend along a lower surface of the snout 4 of the animal. The connecting straps 28 in combination with the distal and interior loops 26 and 28 form a pair of lateral openings 25 in the muzzle 20. The lateral openings 25 are positioned between the distal loop 26 and the interior loop 28 to permit free breathing of the animal when the muzzle 20 is engaged to the snout 4 of the animal.

Most preferably, the distal loop 26 has a diameter less than a diameter of the interior loop 28 such that the muzzle 20 generally conforms to the tapering surface of the snout 4 of the animal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A remote release muzzle system for an animal, the remote release muzzle system comprising:
   a muzzle adapted for fitting to the animal's head, said muzzle having a snout surrounding portion adapted for positioning around a snout of the animal, said muzzle further having an attachment strap assembly adapted for positioning the animal whereby the snout portion is held around the snout of the animal;
   said attachment strap assembly having a pair of attachment straps coupled to a release device, said release device being for disengaging from one of the attachment straps whereby the attachment strap assembly is disengaged from the animal;
   said release device including a receiver for receiving a release signal; and
   a transmitter assembly for sending said release signal from a remote location.

2. The remote release muzzle system of claim 1, wherein the release device further comprises:
   a housing;
   a release tang plate positioned within an interior of said housing, said release tang plate having a first end pivotally coupled to the housing, said release tang plate further having a lip positioned at a second end of the release tang plate, said lip being for engaging a buckle coupled to a first end of one of said attachment straps;
   a spring member positioned within said housing, said spring member abutting a first face of said release tang plate for biasing said release tang plate in a first direction such that said lip engages a locking slot in said buckle when said buckle is inserted into said housing;
   a manual release button extending through a hole in said housing, said manual release button abutting a second face of said release tang plate such that depressing said button compresses said spring member whereby said lip is disengageable from said locking slot in said buckle.

3. The remote release muzzle system of claim 2, further comprising:
   said attachment strap assembly including an adjustable sizing buckle for adjusting the length of one of one of said attachment straps such that the attachment strap assembly is adjustable to snugly engage the animal for preventing accidental removal of the muzzle.

4. The remote release muzzle system of claim 1, wherein the release device further comprises:
   a housing;
   a release tang plate positioned within an interior of said housing, said release tang plate having a first end pivotally coupled to the housing, said release tang plate further having a lip positioned at a second end of the release tang plate, said lip being for engaging a buckle coupled to a first end of one of said attachment straps;
   a spring member positioned within said housing, said spring member abutting a first face of said release tang plate for biasing said release tang plate in a first direction such that said lip engages a locking slot in said buckle when said buckle is inserted into said housing;
   an electromagnet coupled to said housing proximate said second end of said release tang plate, said electromagnet being positioned to attract and engage said release tang plate such that said spring member is compressed when said electromagnet is activated whereby said lip is disengageable from said locking slot of said buckle.

5. The remote release muzzle system of claim 4, wherein said electromagnet is activated by said receiver when said receiver receives said release signal from said transmitter.

6. The remote release muzzle system of claim 5, further comprising:
   a battery positioned in said housing, said battery being for providing power to said receiver and said electromagnet.

7. The remote release muzzle system of claim 4, further comprising:
   a connecting plate fixedly coupled to and extending outwardly from said housing, said connecting plate having a slot therein for receiving one of said attachment straps therethrough such that said attachment strap is fixedly coupled to said housing; and
   said housing including a buckle receiving slot therein, said buckle receiving slot being positioned opposite said connecting plate, said buckle receiving slot further being for receiving said buckle therethrough such that said lip engages said slot in said buckle when said buckle is inserted into said buckle receiving slot.

8. The remote release muzzle system of claim 1, further comprising:
   said transmitter assembly including a transmitter, a transmitter housing, a transmit button for sending said release signal, and a signal light for indication that said release signal is being sent.

9. The remote release muzzle system of claim 1, further comprising:
   said muzzle including a distal loop, an interior loop and a pair of connecting straps extending between said distal loop and said interior loop.

10. The remote release muzzle system of claim 9 wherein one of said connecting straps is adapted to extend along an upper surface of the snout of the animal and the other of the connecting straps is positioned to extend along a lower surface of the snout of the animal to form a pair of lateral openings in said muzzle, said lateral openings being positioned between said distal loop and said interior loop for facilitating breathing of the animal when the muzzle is engaged to the snout of the animal.

11. The remote release muzzle system of claim 9 further comprising:
   said distal loop having a diameter less than a diameter of said interior loop such that said muzzle generally conforms to the tapering surface of the snout of the animal.

12. A remote release muzzle system for an animal, the remote release muzzle system comprising:
   a muzzle adapted for fitting to the animal's head, said muzzle having a snout surrounding portion adapted for positioning around a snout of the animal, said muzzle further having an attachment strap assembly adapted for positioning the animal whereby the snout portion is held around the snout of the animal;

said attachment strap assembly having a pair of attachment straps coupled to a release device, said release device being for disengaging from one of the attachment straps whereby the attachment strap assembly is disengaged from the animal;

said release device including a receiver for receiving a release signal;

a transmitter assembly for sending said release signal from a remote location;

wherein the release device further includes
- a housing;
- a release tang plate positioned within an interior of said housing, said release tang plate having a first end pivotally coupled to the housing, said release tang plate further having a lip positioned at a second end of the release tang plate, said lip being for engaging a buckle coupled to a first end of one of said attachment straps;
- a spring member positioned within said housing, said spring member abutting a first face of said release tang plate for biasing said release tang plate in a first direction such that said lip engages a locking slot in said buckle when said buckle is inserted into said housing;
- an electromagnet coupled to said housing proximate said second end of said release tang plate, said electromagnet being positioned to attract and engage said release tang plate such that said spring member is compressed when said electromagnet is activated whereby said lip is disengageable from said locking slot of said buckle;
- wherein said electromagnet is activated by said receiver when said receiver receives said release signal from said transmitter;
- a battery positioned in said housing, said battery being for providing power to said receiver and said electromagnet; and
- a manual release button extending through a hole in said housing, said manual release button abutting a second face of said release tang plate such that depressing said button compresses said spring member whereby said lip is disengageable from said locking slot in said buckle;

said attachment strap assembly including an adjustable sizing buckle for adjusting the length of one of one of said attachment straps such that the attachment strap assembly is adjustable to snugly engage the animal for preventing accidental removal of the muzzle;

said transmitter assembly including a transmitter, a transmitter housing, a transmit button for sending said release signal, and a signal light for indication that said release signal is being sent;

said muzzle including a distal loop, an interior loop and a pair of connecting straps extending between said distal loop and said interior loop;

wherein one of said connecting straps is adapted to extend along an upper surface of the snout of the animal and the other of the connecting straps is positioned to extend along a lower surface of the snout of the animal to form a pair of lateral openings in said muzzle, said lateral openings being positioned between said distal loop and said interior loop for facilitating breathing of the animal when the muzzle is engaged to the snout of the animal;

said distal loop having a diameter less than a diameter of said interior loop such that said muzzle generally conforms to the tapering surface of the snout of the animal;

a connecting plate fixedly coupled to and extending outwardly from said housing, said connecting plate having a slot therein for receiving one of said attachment straps therethrough such that said attachment strap is fixedly coupled to said housing; and said housing including a buckle receiving slot therein, said buckle receiving slot being positioned opposite said connecting plate, said buckle receiving slot further being for receiving said buckle therethrough such that said lip engages said slot in said buckle when said buckle is inserted into said buckle receiving slot.

\* \* \* \* \*